United States Patent [19]
Jensen

[11] B 3,981,611
[45] Sept. 21, 1976

[54] ELECTRICAL INTERCONNECTION CIRCUITRY FROM A ROTATING BODY TO A RELATIVELY STATIONARY BODY

[75] Inventor: Harry Thomas Jensen, Milford, Conn.

[73] Assignee: United Technologies Corporation, Hartford, Conn.

[22] Filed: Feb. 12, 1975

[21] Appl. No.: 549,394

[44] Published under the second Trial Voluntary Protest Program on January 27, 1976 as document No. B 549,394.

[52] U.S. Cl. .................................. 416/61; 307/145; 416/226
[51] Int. Cl.² .......................................... B64C 27/32
[58] Field of Search .............. 416/61, 226; 307/145, 307/113, 112; 339/241, 242

[56] References Cited
UNITED STATES PATENTS

| | | | |
|---|---|---|---|
| 1,780,431 | 11/1930 | McCarroll | 416/41 |
| 2,551,649 | 5/1951 | Taylor | 416/61 X |
| 2,838,694 | 6/1958 | Hider | 307/145 |
| 3,317,759 | 5/1967 | Grobel | 307/145 |
| 3,547,555 | 12/1970 | Jensen | 416/61 |
| 3,793,533 | 2/1974 | Ginsberg | 307/113 |
| 3,896,446 | 7/1975 | Kondoh et al. | 416/61 X |

*Primary Examiner*—Everette A. Powell, Jr.
*Attorney, Agent, or Firm*—Dominic J. Chiantera

[57] ABSTRACT

In an electrical system requiring an electrical interconnection between a rotating body and a relatively stationary body, a circuit provides a highly reliable electrical interconnection between the bodies through the use of multiple rotary electrical connection assemblies connected in parallel across the rotating interface during normal operation, and connected in series, from the relatively stationary body through one of the rotary electrical connection assemblies to the rotating body and returning to the stationary body through another one of the rotary electrical connection assemblies, for verification of the electrical continuity of the interconnection during a testing operation.

4 Claims, 2 Drawing Figures

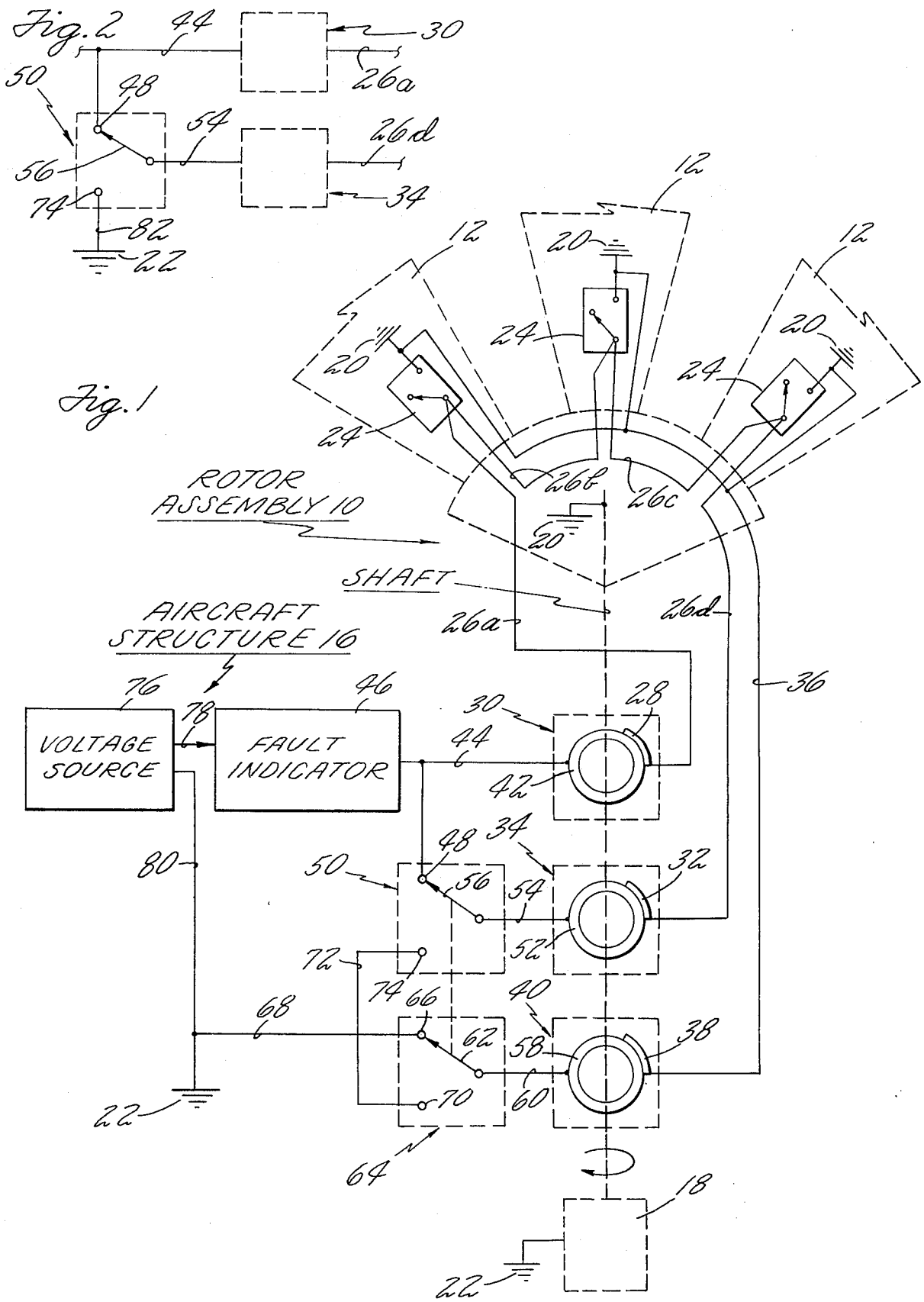

ELECTRICAL INTERCONNECTION CIRCUITRY FROM A ROTATING BODY TO A RELATIVELY STATIONARY BODY

BACKGROUND OF THE INVENTION

1. Field of Invention

This invention relates to electrical interconnection circuitry, and more particularly to circuitry providing electrical interconnection from a rotating body to a relatively stationary body.

2. Description of the Prior Art

In an electrical system requiring the electrical interconnection of a rotating body to a relatively stationary body, the reliability of such an interconnection is determined by its weakest element, namely the mechanical component providing the electrical interconnection between the rotating member and the stationary member. The degree of importance placed upon the reliability of the interconnection is directly related to the ultimate system function, and such systems as those performing safety functions whose ultimate objective is the prevention of human injury or loss of life must necessarily have the highest degree of reliability. One example of such a system is that used in helicopter aircraft for monitoring the structural integrity of the helicopter rotor blades. This parameter, which is so essential to the airworthiness of the aircraft, requires a monitoring system with a high degree of reliability to assure the detection of a structural failure when it occurs. Also, due to the low frequency of occurrence of such a structural failure, the system must minimize the occurrence of erroneous failure indications which destroy system credibility (causing valid failures to be ignored) or which may initiate unnecessary emergency procedures. Due to the difficulty of providing a reliable rotating interconnection, some prior art methods of checking the structural integrity of the helicopter rotor blades have been limited to visual inspection of the individual blades while the aircraft is on the ground, and the rotor is in a static condition. A more detailed method of blade inspection is disclosed in a patent to R. A. Parr, U.S. Pat. No. 3,667,862 wherein the spar assemblies which mount the airfoils to the rotor head are hermetically sealed and evacuated. Pressure transducers are used to sense the vacuum; however, the transducer is only used to provide an indication during ground testing of the aircraft with the rotor again in the static condition. Under both of these methods potential failures resulting from dynamic operation of the rotor blade assemblies cannot be detected during flight.

A system for monitoring the structural integrity of individual rotor blades while the aircraft is in flight is disclosed in a patent to Jensen, U.S. Pat. No. 3,547,555. In this system, the individual spar assemblies connecting each blade to the rotor assembly are hermetically sealed and pressurized to an internal ambient pressure above atmosphere. Pressure transducers mounted on the individual spar assemblies monitor the internal ambient pressure and provide a discrete signal to a monitoring system within the aircraft cockpit for a reduction of the ambient pressure within the spar due to a loss of the spars structural integrity, thereby providing an indication of the detected failure to the pilot. That system uses a rotary transformer to conduct the discrete signal, provided by the pressure transducers, from the rotating blade assembly to the aircraft structure. The closing of a contact in the pressure transducer causes a change in the reflected impedance of the transformer primary winding, which causes an indicator to warn the pilot of potential failure. This system suffers from the disadvantage of using a single rotary transformer which is mechanically unreliable under constant rotational use, with the further disadvantage of requiring a relatively complex electrical circuit for detecting the transformer impedance change, which causes a reduction in the electrical reliability of the system due to the number of electrical components required. In summary, the prior art has failed to provide high reliability monitoring of the structural integrity of helicopter rotor blades, due to the lack of a highly reliable electrical interconnection between the rotor assembly and the aircraft structure.

SUMMARY OF INVENTION

The object of the present invention is to provide highly reliable electrical interconnection between a rotating body and a relatively stationary body.

According to the invention, circuitry connected to an electrical utilization means mounted on a first body includes switches having an operating position and a test position which are settable to either position alternatively. When the switches are in the operating position, the circuitry connects the utilization circuit to a plurality of sensing circuits mounted on a second body which is in relative rotation to the first, through a plurality of rotary electrical connection elements connected in parallel, and when the switches are in the test position, the circuitry connects the utilization circuit to the sensing circuits through only one of the rotary electrical elements in the group, and connects the sensing circuits through at least another one of the rotary electrical elements in the group to ground of the first body.

According to one embodiment of the present invention, the switching circuit connects the high potential side of electrical transducers mounted on the rotating body through a pair of redundant slip ring assemblies, connected in parallel, to fault indicating circuitry mounted on the relatively stationary body when the switch is in the operating position. When the switch is in the test position, the switching circuit connects the fault indicating circuit to the transducers on the rotating body through a single slip ring assembly, and connects the rotating electrical components to the electrical ground of the relatively stationary body through the second slip ring assembly, in a series circuit. In further accord with the present invention, a third slip ring assembly may be provided which connects electrical ground of the rotating body to the electrical ground of the relatively stationary body when the switching circuit is in the operating position, and connects the hereinbefore mentioned series circuit of the electric utilization circuitry and slip ring assemblies to the electrical ground of the rotating body, when the switching circuit is in the test position.

The present invention provides a highly reliable electrical interconnection through the use of redundant rotary electrical connection elements to increase the mechanical reliability of the interconnection, and simplified electrical circuitry to increase the electrical reliability of the system. The present invention further provides operational testing of the entire system, to verify electrical continuity of the interconnection, while the two bodies are in relative rotation.

BRIEF DESCRIPTION OF THE DRAWINGS

FIG. 1 is a schematic diagram of an exemplary utilization of the present invention as used within a helicopter blade inspection system;

FIG. 2 is a partial schematic diagram of an alternative embodiment of the invention.

DESCRIPTION OF THE PREFERRED EMBODIMENT

Referring now to FIG. 1, an exemplary utilization of the invention, in a helicopter blade inspection system, permits the monitoring of the structural integrity of the individual rotor blades during dynamic operation of the rotor assembly. A rotor assembly 10 comprising a plurality of spar assemblies 12 is connected to a shaft 14, which is connected to the aircraft structure 16 through the mechanical rotating apparatus 18 which provides rotation of the shaft 14 with respect to the aircraft structure 16 (including the engine, gears and bearings and the like). The shaft 14 also provides electrical contact between electrical ground 20 on the rotor assembly and electrical ground 22 on the aircraft structure. The spar assemblies 12, which connect the individual rotating airfoils to the rotor head, are hermetically sealed structures that are pressurized to a pressure above ambient. Sensing means, such as a plurality of pressure transducers 24, are mounted upon the spar assemblies 12 to sense the internal ambient pressure of the spar assemblies. Each of the transducers 24 provides a discrete signal in the form of an open circuit between a line 26, comprised of the lines 26a–d, and the rotor ground 20 while the ambient pressure within the spar assemblies 12 is maintained at its prescribed pressure, and provides a discrete signal in the form of a low impedance closure between the line 26 and the rotor ground 20 for a loss of ambient pressure within the spar 12. One end of the line 26 is connected to the rotating element 28 (which may comprise a brush assembly) of a slip ring assembly 30, or any other suitable rotary electrical connection means. The other end of the line 26 is connected to the rotating element 32 of a slip ring assembly 34. The rotor ground 20 is connected through a line 36 to the rotating element 38 of a slip ring assembly 40. The slip ring assemblies 30, 34, 40 are disposed upon the shaft 14 in such a manner as to cause the rotating elements 28, 32, 38 to rotate with the shaft 14. The slip ring assembly 40 may either be any normally-provided rotary electrical ground connection within the mechanical rotating apparatus 18, or may be in addition thereto, in dependence upon the design requirements of the environment within which the invention is practiced. The stationary element 42 of the slip ring assembly 30 is in electrical contact with the rotating element 28 and is connected by a line 44 to electric utilization circuitry such as a fault indicator 46, and is also connected to the normally closed contact 48 of a switch assembly 50. The stationary element 52 of the slip ring assembly 34 is connected by a line 54 to the wiper 56 of the switch assembly 50. The stationary element 58 of the slip ring assembly 40 is connected by a line 60 to the wiper 62 of a second switch assembly 64, which may be ganged with the switch assembly 50 for concurrent operation, having its normally closed contact 66 connected through a line 68 to the structure electrical ground 22, and its normally open contact 70 connected through a line 72 to the normally closed contact 74 of the switch assembly 50. A voltage source 76 provides electric potential between a line 78, which is connected to the fault indicator 46, and a line 80 which is connected to the structure ground 22.

In operation, the switch assemblies 50, 64 are in the operating position (as shown in FIG. 1) causing the wipers 56, 62 to make electrical contact with the normally closed contacts 48, 66. This causes the line 54 to be connected to the line 44, such that the slip ring assemblies 30, 34 are connected as a parallel electrical path between the line 26 and the fault indicator 46, with the slip ring assembly 40 providing a redundant electrical ground between the rotor ground 20 and the structure ground 22 in addition to the electrical contact made between these grounds through the mechanical assembly 18. With all of the spar assemblies 12 at their normal internally pressurized condition, the transducers 24 will provide an open signal on the line 26, such that an open electrical path will exist and no current will flow from the voltage source 76 through the fault indicator 46 to ground. In the event of a depressurization of one or more of the spar assemblies 12 indicating a loss of structural integrity, the related one of pressure transducers 24 will provide a discrete closure to the rotor ground 20 allowing current to flow from the voltage source 76 through the fault indicator 46 and the parallel slip ring assemblies 30, 34, through the closed pressure transducer 24 to the rotor ground 20, and returning to the structure ground 22 through the redundant ground path provided by the slip ring assembly 40 and the mechanical assembly 18, thereby activating the fault indicator circuit 46 which provides an appropriate warning signal. In the operating condition, the slip ring assembly 34 is connected in parallel with the slip ring assembly 30 creating a duplication, or redundancy of the electrical interconnection which provides a high degree of reliability through the most failure-prone portion of the interconnection circuitry, that being the mechanical rotational element of the slip ring assemblies. In addition, the parallel slip ring assemblies 30, 34 provide two separate connections for the lines 26a–26d, creating an additional redundancy of the wiring between the transducers 24 and the fault indicator 46, and assuring system operation for a loss of electrical continuity through one of the elements 26a–26d. Thus, if the line 26c is broken or otherwise fails to provide electrical connection, the pressure transducers 24 are all connected through separate paths consisting of lines 26b and 26a through slip ring assembly 30, and lines 26d through slip ring assembly 34.

To provide further assurance of electrical continuity of the interconnection interface, a test position is provided for the switch assemblies 50, 64 which when selected causes the wiper assemblies 56, 62 to be connected to the normally open contacts 74, 70 creating a series electrical path from the voltage source 76 through the fault indicator 46, the slip ring assembly 30, the line 26, the slip ring assembly 34, the line 72, the slip ring assembly 40, and the line 36 to the rotor ground 20; and from the rotor ground 20 through the mechanical assembly 18 to the structure ground 22. This single test, which may be performed during actual operation of the rotor assembly, provides immediate verification of the electrical continuity of the entire interconnection system. In the event of a failure of one of the slip ring assemblies 30, 34, or loss of electrical continuity of one of the lines 26a–26d, during the time interval between tests, the ability of the monitoring system to perform will not be lost since the second slip ring assembly and wiring of the redundant path will provide electrical continuity to the indicator 46. A loss of monitoring capability will only occur for the condition of concurrent failures in both of the parallel interconnections.

An alternative embodiment of the invention is shown in FIG. 2, where the slip ring assembly 40 of FIG. 1 has been omitted, and the electrical contact provided by the mechanical assembly 18 between the rotor ground 20 and the structure ground 22 is relied upon to provide the return current path during closure of the transducers 24. Referring now to FIG. 2, when the switch assembly 50 is in the operating position, the slip ring assemblies 30, 34 are connected in parallel through the wiper 56 and the normally closed contact 48. When the switch 50 is transferred to the test position, the wiper assembly 56 makes electrical contact with the normally open contact 74, which is connected to the structure electrical ground 22 through a wire 82. This causes the fault indicator 46 of FIG. 1 to be connected in series with the slip ring assemblies 30, 34 to the structure ground 22, thereby verifying the electrical continuity of the two slip ring assemblies by the response of the fault indicator circuit 46. Thus, in both the embodiments of FIGS. 1 and 2 testing of the circuit connects the fault indicator through the series-connected group of redundant slip ring assemblies 30, 34 to ground 22 of the relatively stationary body. Although the embodiment of FIG. 2 does not provide the same degree of integrity as the embodiment of FIG. 1, it may be preferred where simplicity is paramount, such as retrofit of prior art systems.

The exemplary embodiments described hereinbefore represent one utilization of the interconnection circuit disclosed by the present invention, in a system which monitors the physical integrity of a helicopter rotor blade assembly. The simplicity of the circuit together with its use of passive elements, the use of redundant slip ring assemblies, and its provision for dynamic testing of the electrical continuity of the interconnecting circuit, provides an efficient and highly reliable system for monitoring such a critical parameter which is essential to the airworthiness of the aircraft. The circuit of the present invention may likewise be used in any system in which there is a requirement for monitoring other parameters of a rotating assembly, such as temperature, or velocity, and transmitting this data through an electrically continuous path to a relatively stationary indicator or measuring device. Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described typical embodiments of my invention, that which I claim as new and desire to secure by Letters Patent of the United States is:

1. An electric system including relatively rotating parts with apparatus providing a highly reliable interconnection therebetween, comprising:
    first and second bodies each having electrical ground;
    means including a plurality of rotary electrical connection means for disposing one of said bodies for rotation on the other of said bodies with electrical contact therebetween;
    a power source having first and second outputs and disposed on a first one of said bodies, said first output connected to ground of said first body;
    electric utilization means disposed on said first body having a first terminal connected to said second output, and having a second terminal;
    electrical sensing means disposed on the second one of said bodies for sensing a condition on said second body and interconnected from ground on said second body to a group of said plurality of rotary electrical connection means; and
    circuitry connected to said second terminal of said utilization means, including switch means having an operating position and a test position and being settable to either of said positions alternatively, said circuitry connecting said utilization means to said sensing means through all of said rotary electrical connection means in said group in parallel when said switch means is in said operating position and connecting said utilization means to said sensing means through one of said rotary electrical connection means in said group and connecting said sensing means through at least another one of said rotary electrical connection means in said group to ground of said first body when said switch means is in said test position.

2. A system according to claim 1 wherein said plurality of rotary electrical connection means comprises:
    a first rotary electrical connection means connected by said circuitry between said utilization means and said sensing means; and
    a second rotary electrical connection means connected by said circuitry in parallel with said first rotary electrical connection means when said switching means is in said operating position, and connected in a series from said utilization means through said first rotary electrical connection means to said sensing means, and from said sensing means through said second rotary electrical connection means to ground of said first body when said switching means is in said test position.

3. A system according to claim 1 wherein said plurality of rotary electrical connection means comprises:
    first, second and third rotary electrical connection means, said third rotary electrical connection means connected by said circuitry from ground of said first body to ground of said second body when said switching means is in said operating position, and removed from ground of said first body and connected to said second rotary electrical connection means when said switching means is in said test position, said first rotary electrical connection means connected by said circuitry between said utilization means and said sensing means, said second rotary electrical connection means connected by said circuitry in parallel with said first rotary electrical connection means when said switching means is in said operating position, and connected from said sensing means through said third rotary electrical connection means to ground of said second body when said switching means is in said test position.

4. In an aircraft having a rotor assembly provided with a plurality of airfoils disposed thereon through a like plurality of pressurized spars, with the rotor assembly connected to a shaft which is mounted to the aircraft structure through a mechanical assembly that allows rotation of the shaft and rotor assembly with respect to the aircraft structure and which creates an electrical contact between the electrical grounds of the rotor assembly and the aircraft structure, apparatus for monitoring the internal pressure of the spars, comprising:
- a power source having first and second outputs and disposed within the aircraft structure, said first output connected to electrical ground of the structure;
- fault responsive means disposed within the aircraft structure having a first terminal connected to said second output of said power source, and having a second terminal;
- a plurality of pressure transducers having first and second outputs, each disposed upon a corresponding one of the pressurized spars, all of said first outputs connected together, and all of said second outputs connected to the electrical ground of the rotor assembly;
- a pair of slip ring assemblies having stationary and rotating elements and disposed upon the shaft, said rotating elements connected to said first outputs of said transducers; and
- circuitry connected to said second terminal of said fault responsive means, including switch means having an operating position and a test position and being settable to either of said positions alternatively, said circuitry connecting said fault responsive means to said first outputs of said transducers through said stationary elements of said pair of slip ring assemblies in parallel when said switch means is in said operating position and connecting said utilization means to said first outputs of said transducers through one of said slip ring assemblies and connecting said first outputs of said transducers to the electrical ground of the aircraft structure through a second one of said slip ring assemblies when said switch means is in said test position.

* * * * *